(12) United States Patent
Moors

(10) Patent No.: US 11,392,353 B2
(45) Date of Patent: Jul. 19, 2022

(54) METHOD FOR GENERATING SOURCE CODE USING SERVICE-BASED COMMUNICATION

(71) Applicant: dSPACE digital signal processing and control engineering GmbH, Paderborn (DE)

(72) Inventor: Sebastian Moors, Paderborn (DE)

(73) Assignee: DSPACE GMBH, Paderborn (DE)

( * ) Notice: Subject to any disclaimer, the term of this patent is extended or adjusted under 35 U.S.C. 154(b) by 18 days.

(21) Appl. No.: 17/016,499

(22) Filed: Sep. 10, 2020

(65) Prior Publication Data

US 2021/0089280 A1 Mar. 25, 2021

(30) Foreign Application Priority Data

Sep. 13, 2019 (DE) .......................... 102019124663.6
Sep. 9, 2020 (DE) .......................... 102020123506.2

(51) Int. Cl.
*G06F 9/44* (2018.01)
*G06F 8/35* (2018.01)
*G06F 8/33* (2018.01)
*G06F 8/38* (2018.01)

(52) U.S. Cl.
CPC ................. *G06F 8/35* (2013.01); *G06F 8/33* (2013.01); *G06F 8/38* (2013.01)

(58) Field of Classification Search
USPC ........................................................ 717/104
See application file for complete search history.

(56) References Cited

U.S. PATENT DOCUMENTS

| 7,240,338 | B1* | 7/2007 | Bell | G06F 8/51 717/137 |
| 7,509,244 | B1* | 3/2009 | Shakeri | G06F 8/453 717/109 |
| 7,523,023 | B1* | 4/2009 | Koh | G06F 8/35 703/22 |
| 8,041,551 | B1* | 10/2011 | Pakyari | G06F 17/10 716/117 |
| 8,046,202 | B1* | 10/2011 | Yang | G06F 8/20 717/136 |
| 8,180,964 | B1* | 5/2012 | Koh | G06F 11/3442 711/118 |
| 8,706,964 | B1* | 4/2014 | Koh | G06F 12/084 711/118 |
| 9,665,350 | B1* | 5/2017 | Kalmar | G06F 11/3684 |

(Continued)

*Primary Examiner* — Anna C Deng
(74) *Attorney, Agent, or Firm* — Leydig, Voit & Mayer, Ltd.

(57) ABSTRACT

A block diagram includes at least a first block that exchanges data with an external service. The first block references a discovery object in a data definition collection. The discovery object defines a selection criterion. A method for generating source code from one or a plurality of blocks of the block diagram includes: opening, by a computer system, the block diagram including the first block in a model editor; reading, by the computer system, out the referenced discovery object from the data definition collection; generating, by the computer system, an application source code based on at least the first block; and generating, by the computer system, a service discovery source code based on at least the referenced discovery object.

10 Claims, 5 Drawing Sheets

(56) References Cited

U.S. PATENT DOCUMENTS

2006/0064670 A1\*  3/2006  Linebarger ................ G06F 8/34
                                                        717/106
2018/0088911 A1\*  3/2018  Moors ........................ G06F 8/71
2018/0101370 A1\*  4/2018  Huang .................... G06F 8/447

\* cited by examiner

METHOD FOR GENERATING SOURCE CODE USING SERVICE-BASED COMMUNICATION

CROSS-REFERENCE TO PRIOR APPLICATIONS

Priority is claimed to German Patent Application No. 102019124663.6, filed on Sep. 13, 2019, and German Patent Application No. 102020123506.2, filed on Sep. 9, 2020, the entire disclosures of which are hereby incorporated by reference herein.

TECHNICAL FIELD

The present invention relates to generating executable code from a block diagram, in particular for programming control units.

BACKGROUND

Control units are used in a plurality of applications to detect physical quantities of a process and/or act on a process via connected actuators; an example is an antilock control of a braking operation. The time constants, which determine the dynamic behavior of the process, often require cycle times of 1 ms or less, so that a real-time capability of the control unit is needed.

To accelerate the design of control units, control strategies based on models in a computing environment, such as MATLAB/Simulink, are often developed. Thus, the behavior of the control unit can first be simulated, and the presence of desired properties checked. Specifically, the models can be block diagrams which include blocks for performing operations, such as computations, a block being able to compute an output signal, for example, from a plurality of input signals. Block diagrams are typically executed cyclically, all blocks being permanently held in the memory, and each block being executed once per time step. In particular, a block can subject input signals from the most recent step to one or a plurality of operations to generate output signals of the current step. From the models, a code generator can directly generate source code for programming the control unit. For example, a code generator for generating production quality source code is known (by the name TargetLink) from the document "Production Quality Code Generation from Simulink Block Diagrams," *Proceedings of the* 1999 *International Symposium on Computer Aided Control System Design*, Kohala Coast, Hi., by H. Hanselmann et al.

For many years, the development partnership AUTOSAR (AUTomotive Open System ARchitecture) has defined a software framework for developing control unit software (detailed information can be found at www.autosar.org). Prior to implementation of the actual control strategy or the desired behavior, an architecture of the software is defined. For example, the software architecture can correspond to the AUTOSAR classic platform standard version 4.3.0 of Nov. 30, 2016. The architecture includes software components, subcomponents such as runnables, and interfaces of software components. The messaging among the various software components is carried out via the virtual function bus of a runtime environment (RTE), which is generated in a manner that is tailored to the specific control unit on the basis of the defined architecture. A thus generated control unit software is efficient, but inflexible—an adaptation requires that the runtime environment be newly generated and the binary code stored on the control unit.

Due to the increased networking of control units in present-day vehicles, the higher level communication associated therewith among the components involved, as well as the possibility of introducing new components via OTA (over-the-air) updates, there is a need for new, flexible communication architectures to allow efficient communication in the vehicle. For this, the Adaptive AUTOSAR platform was developed, which, on the basis of an operating system, such as Linux, provides a middleware having modern interfaces. Using modern communication architectures, the AUTOSAR runtime for adaptive applications, defined, for example, in the AUTOSAR Adaptive Release 19.03 of Mar. 29, 2019, supports highly dynamic communication in systems of networked control units. Thus, the functional cluster ara::com provides a service-based architecture to allow communication relations that first arise or are established at runtime of a control unit.

SUMMARY

In an exemplary embodiment, the present invention provides a method for generating source code from one or a plurality of blocks of a block diagram. The block diagram includes at least a first block that exchanges data with an external service. The first block references a discovery object in a data definition collection. The discovery object defines a selection criterion. The method includes: opening, by a computer system, the block diagram including the first block in a model editor; reading out, by the computer system, the referenced discovery object from the data definition collection; generating, by the computer system, an application source code based on at least the first block; and generating, by the computer system, a service discovery source code based on at least the referenced discovery object.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
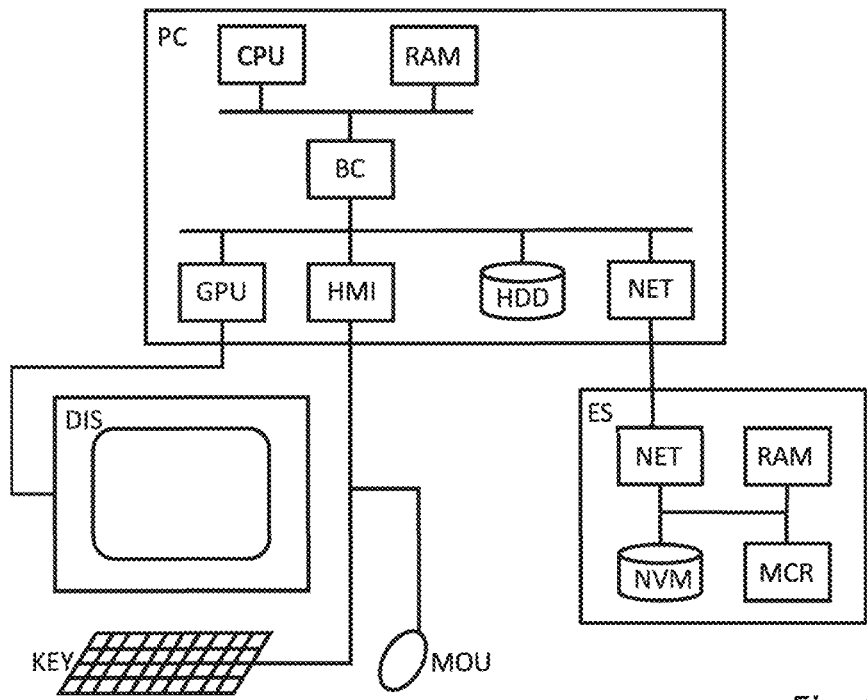
FIG. 1 shows an exemplary embodiment of a computer system.

In a service-based architecture as discussed above, a situation may arise where a service is offered by one or a plurality of service providers. To develop applications for such a service-based architecture, it should be clarified, which specific instance of a service is to be used for communication on a particular model element.

Exemplary embodiments of the present invention provide a user-friendly description of service-based communication connections in the case of a model-based development.

Exemplary embodiments of the present invention include a method for generating source code, a computer program product, and a computer system.

In an exemplary embodiment, a method is provided for generating source code from one or a plurality of blocks of a block diagram, the block diagram including at least a first block that exchanges data with an external service, the first block referencing a discovery object in a data definition collection, the discovery object defining a selection criterion. The method includes the following steps: opening the block diagram including the first block in a model editor, reading out the referenced discovery object from a data definition collection, generating an application source code on the basis of at least the first block, and generating a service discovery source code on the basis of at least the referenced discovery object.

In particular, the statement that a first block exchanges data with a service relates to the code generated from the first block receiving data from the external service and/or transmitting data to the external service. In a service discovery, the service instance is determined from which the application source code generated from the first block receives data, for example. For this, a request for the desired service is issued and, from the answers received, a service instance is selected on the basis of a selection criterion (or the selection criterion is already specified in the request).

A plurality of blocks may be interconnected by signal connections. Data, respectively signals may be transmitted via a signal connection; in this case, a first block outputs a value or, depending on the definition, a plurality of associated values, and a second block receives these and takes them into account when determining one or a plurality of associated output values of the second block. Signals may include scalar variables and/or structured data types, such as arrays, as is typical in the case of a bus, for example.

The present invention has a multitude of advantages:

Applying a method according to the present invention, code may be generated for service discovery components of an adaptive AUTOSAR application substantially as a model-based process. This eliminates a break in the development methodology which a manual implementation would entail. Thus, function developers may substantially work in their familiar environment (MATLAB/Simulink, respectively TargetLink) without themselves having to make changes to the source code or having to have detailed knowledge of the programming language and the application interface (API) used. In comparison to conventional products, which do not offer any configurable service discovery, the use of the present invention thereby brings significant added value to the customer.

In the same way, a simpler prototyping and a simpler test of the components to be developed are possible since, for example, only changes at a central location are required to use dedicated test instances of a service.

Moreover, there are the following advantages:

better overview of the service instances used due to central management in a data definition collection, i.e. a data dictionary;

higher quality code due to quality assured production code generation, making it possible to avoid errors in the manual implementation of the complete service discovery process;

the possibility exists of a visualization of the service instances/proxies to be used, thereby facilitating checking correctness at the functional level and preventing modelling errors.

Separately generating application source code and service discovery source code makes possible a selective adaptation to the respective purpose. Thus, the application source code may preferably be optimized with regard to the code size and/or execution time; the service discovery source code may, in particular, be generated without complex optimizations. It is also readily possible to generate the application source code in a different textual programming language than the service discovery source code.

The flexibility and adaptability of the approach is advantageous in the field of model-based software development for service-based communication.

The selection criterion is preferably checked, respectively predetermined by user-provided code, or the selection criterion selects the first service instance signaled back in response to a service discovery request, or the selection criterion selects the service instance signaled back in response to a service discovery request using a predetermined technical identifier, or the selection criterion selects the service instance signaled back in response to a service discovery request using a predetermined logical identifier. Integrating code provided by the user to predetermine the selection criterion makes it possible for existing codes to be reused and, moreover, supports any conditions. When the selection criterion predetermines the selection of the first service instance to be signaled back, this may be advantageous with regard to minimal outlay for definition, respectively with regard to convenience and/or adaptation to the specific network architecture. Depending on available information about the desired service instance, on the basis of a technical or logical identifier of the desired service instance, it may be ensured that the same data source is always used. A technical identifier may be an IP address and a port, for example; a logical identifier may be a defined name, for example. A service instance may be selected on the basis of a signaled back list or directly by specifying a desired technical or logical identifier when making the request.

It is advantageous when the application source code is generated by a first code generator, and the service discovery source code is generated by a second code generator. Specifically, the first code generator may be adapted for processing a multiplicity of blocks in order to generate an intermediate representation, and to generate source code therefrom in a textual programming language, whereas the second code generator does need not need to be adapted for processing blocks of a block diagram. The first code generator may be adapted to apply a multiplicity of optimization rules and/or transformations to the generated intermediate representation in order to generate the application source code. The second code generator may be based on a pattern replacement. The use of two code generators may be transparent to the user as they are automatically invoked in succession (for example, by script control).

During or after generation of the application source code, information, which is at least about the first block, is preferably stored in the data definition collection, the service discovery source code being generated solely on the basis of information from the data definition collection. This makes it possible to generate the service discovery source code only for those discovery objects that have also been referenced in blocks of the model. When the service discovery source code is generated solely on the basis of the data definition collection, only this source code may be newly generated in the context of changed settings for service discovery, while the application source code may be retained (in the case of an unchanged model).

The generated source code may be advantageously used on a control unit in an adaptive AUTOSAR environment. The service discovery source code may be generated in an object-oriented language such as C++, for example, and include invoking a proxy constructor.

In an exemplary embodiment, the block diagram includes a second block which references a discovery object, the discovery object referenced in the first block and the discovery object referenced in the second block having the same selection criterion, but differing in at least one parameter, in particular a queue length, and service discovery source code for addressing two separate service proxies being generated from the two discovery objects. Thus, the service discovery source code may include two invocations of proxy constructors, from which are formed two separate proxy objects having different configurations. Due to the fact that discovery objects are stored in the data definition collection, the user may have further service proxies generated simply by copying and adapting individual parameters.

The present invention also relates to a computer program product having a computer-readable memory medium on which instructions are embedded which, when executed by a processor, have the effect of adapting the processor to execute a method in accordance with the present invention.

The present invention also relates to a computer system including a human-machine interface, a non-volatile memory and a processor, the processor being adapted to execute a method in accordance with the present invention.

The present invention is clarified in greater detail in the following with reference to the drawings. Here, like parts are denoted by identical designations. The illustrated specific embodiments are highly schematized; i.e. the distances and the lateral and vertical dimensions are not to scale and, unless indicated otherwise, also do not have any mutual geometric relationships that are derivable therefrom.

FIG. 1 shows an exemplary embodiment of a computer system PC. It has a processor CPU, which, in particular, may be realized as a multicore processor, a main memory RAM and a bus controller BC. Computer system PC is preferably designed to be manually operated directly by a user, a monitor DIS being connected via a graphics card GPU, and a keyboard KEY and a mouse MOU being connected via a peripheral interface HMI. In principle, the human-machine interface of computer system PC could also be in the form of a touch interface. Furthermore, the computer system includes a non-volatile data memory HDD, which, in particular, may be in the form of a hard disk and/or a solid state disk, as well as an interface NET, in particular a network interface. A control unit ES may be connected via interface NET. In principle, one or a plurality of any desired interfaces, in particular wired interfaces, may be present on computer system PC and be used in each case for the connection to a control unit ES. A network interface according to the Ethernet standard may be expediently used; interface NET may also be in a wireless form, in particular as a wireless local area network (WLAN) interface or in accordance with a standard such as Bluetooth.

Control unit ES may be realized as a production control unit or as an evaluation board for a target platform. It expediently includes an interface NET for connection to computer system PC, a microcontroller MCR having an architecture that deviates from the processor of the computer system, a main memory RAM and a non-volatile memory NVM.

Figure 2:
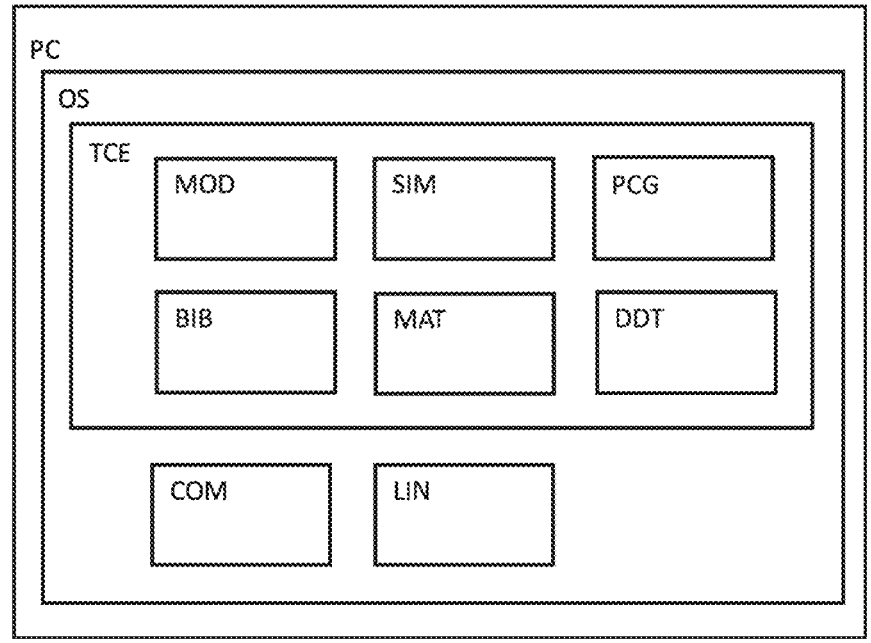
FIG. 2 is a schematic representation of the software components that are preferably present on a computer system.

FIG. 2 is a diagrammatic representation of the software components that are preferably installed on computer system PC. They use mechanisms of operating system OS in order to access non-volatile memory HDD, for example, or to establish a connection to an external computer via network interface NET.

A technical computing environment TCE makes it possible for models to be created and for source code to be generated from the models. In a modeling environment MOD, models of a dynamic system may preferably be created via a graphical user interface. It may be a question here of block diagrams, in particular, which include a plurality of blocks and describe the temporal behavior and/or internal states of a dynamic system. At least some of the blocks are connected via signals, thus, directed connections for exchanging data, which may be scalar or composite. Blocks may be atomic, thus, in one step, provide a predefined functionality. If block diagrams are hierarchical, a multiplicity of blocks at a subordinate level may describe the structure of a block at a superordinate level. Atomic blocks may then also expediently include a multiplicity of blocks at a subordinate level. In particular, composite blocks may be subsystems; subsystems may have additional properties, such as implementation in a separate function and/or triggering implementation of the subsystem via a dedicated signal. Special blocks may be located in subsystems to further specify the properties thereof. Computing environment TCE includes one or a plurality of libraries BIB, from which blocks, respectively modules for building a model may be selected. In a scripting environment MAT, instructions may be entered interactively or via a batch file to perform computations or modify the model. Furthermore, computing environment TCE includes a simulation environment SIM, which is adapted for interpreting or executing the block diagram in order to analyze the temporal behavior of the system. These computations are preferably performed using high-accuracy floating-point numbers on one or a plurality of cores of microprocessor CPU of the computer system.

From a created model, source code may preferably be generated in a programming language, such as C, with the aid of a code generator PCG. Additional information about the model, in particular about the block variables, is expediently provided in a data definition collection DDT. Ranges of values and/or scaling operations are expediently assigned to the block variables to support a computation of the model using fixed point instructions. Desired properties of the source code, for example, conformity to a standard such as MISRA, may also be set, respectively stored in data definition collection DDT. Each block variable is expediently assigned to a predetermined variable type, and one or a plurality of desired properties, such as, for example, the validity of optimizations, such as a combining of variables, are/is set. Code generator PCG preferably evaluates the settings of data definition collection DDT and takes these into account when generating the source code. Data definition collection DDT may have a tree structure, respectively be stored as a simple file in a memory of the computer system; alternatively, it may be provided that the data definition be stored in a dedicated database system. The data definition collection may have a program interface and/or import/export functions.

Computer system PC has a compiler COM and a linker LIN, which are expediently adapted for generating binary files that are executable on a control unit ES and/or on computer system PC. In principle, a multiplicity of compilers may be present, in particular cross-compilers for various target platforms, in order to support control units, respectively evaluation boards ES having different processor architectures.

Figure 3:
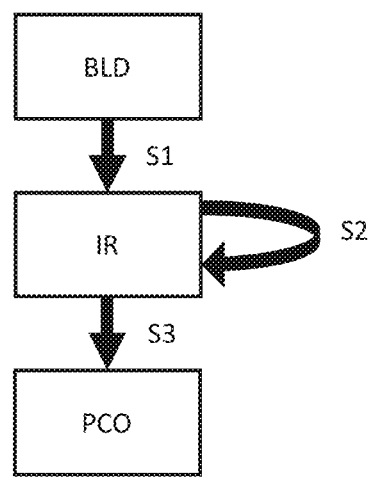
FIG. 3 is a general schematic of the generation of source code.

FIG. 3 is a general diagrammatic representation of a code generator generating source code (in particular from a block diagram). The method may be completely executed by a processor of an exemplary embodiment of computer system PC; for execution in a client-server environment, however, it may also be provided with a service computer and one or a plurality of network-connected servers, specifically, computationally intensive steps being performed on the servers.

In a first step S1, a transformation, the selected model is transformed from one or a plurality of blocks of block diagram BLD into an intermediate representation IR, which preferably includes one or a plurality of hierarchical graphs. In particular, this may be a data flow graph, a control flow graph or a tree structure. In addition to block diagram BLD, additional information from a data definition collection DDT is also expediently considered during generation of the intermediate representation, respectively flows thereinto. This may also include situations where elements are generated on the basis of information in data definition collection DDT, or properties of elements, respectively settings relevant to the code generation, such as the data type of a variable, for example, are extracted from data definition collection DDT.

In a second step S2, an optimization, the hierarchical graphs are optimized to reduce the number of required variables and/or a memory usage, such as a stack allocation, and/or the number of operations, respectively processor instructions and/or the execution time of the source code. This optimization may include a multiplicity of intermediate steps in which further intermediate representations between the model/block diagram and the source code/program text are generated. In particular, it may be provided in each intermediate step for a set of original hierarchical graphs to be converted into a different set of modified hierarchical graphs, one or a plurality of optimization rules being applied. Various strategies, such as "constant folding," or an elimination of "dead code" may be applied during the optimization. It may also be provided for individual optimizations to be applied already in the course of the transformation of step S1, particularly when they are able to be more readily performed on a block diagram representation. In exemplary embodiments of the present invention, it is possible both for a plurality of variables generated in step S1 to be combined in step S2 and for a plurality of variables of the block diagram to be combined in step S1 in a way that enables already the first intermediate representation to include just one variable.

In a third step S3, a translation, optimized intermediate representation IR, respectively optimized hierarchical graphs, which result from the totality of intermediate steps performed, are translated into source code PCO of a textual programming language, such as, in particular, C code. In this step as well, a further optimization may take place, in particular in a way that enables the generated instructions to represent a subset of the instructions basically included in the language, and/or the generated control structures to represent a subset of the control structures basically included in the language. Precisely defined rules may thereby be satisfied. Alternatively or additionally, additional information may be generated, such as, for example, a reference between the program line and the block of block diagram BLD, and, in particular, integrated as comments into the source code, in order to improve the readability of source code PCO and/or simplify a debugging.

During or subsequently to the code generation, information about the current block diagram, the generated source code or results of the code generation, such as warnings, for example, may be stored in the data definition collection. This information may be used, for example, to influence a compilation of the generated source code or provide metainformation for other tools, for example, such as calibration information in ASAP2 format or information for generating an intermediate layer according to the AUTOSAR standard. When a block references a service discovery object, the name of a function generated from the block or information on those service discovery objects required by the application source code, for example, may be stored. It may be provided that the information stored in the data definition collection be read out by a separate code generator in order to generate additional source code, such as wrapper code, respectively service discovery source code on the basis thereof.

Alternative exemplary embodiments of the present invention may provide that code in a hardware description language or a configuration of a programmable hardware module be generated from the block diagram.

Figure 4:
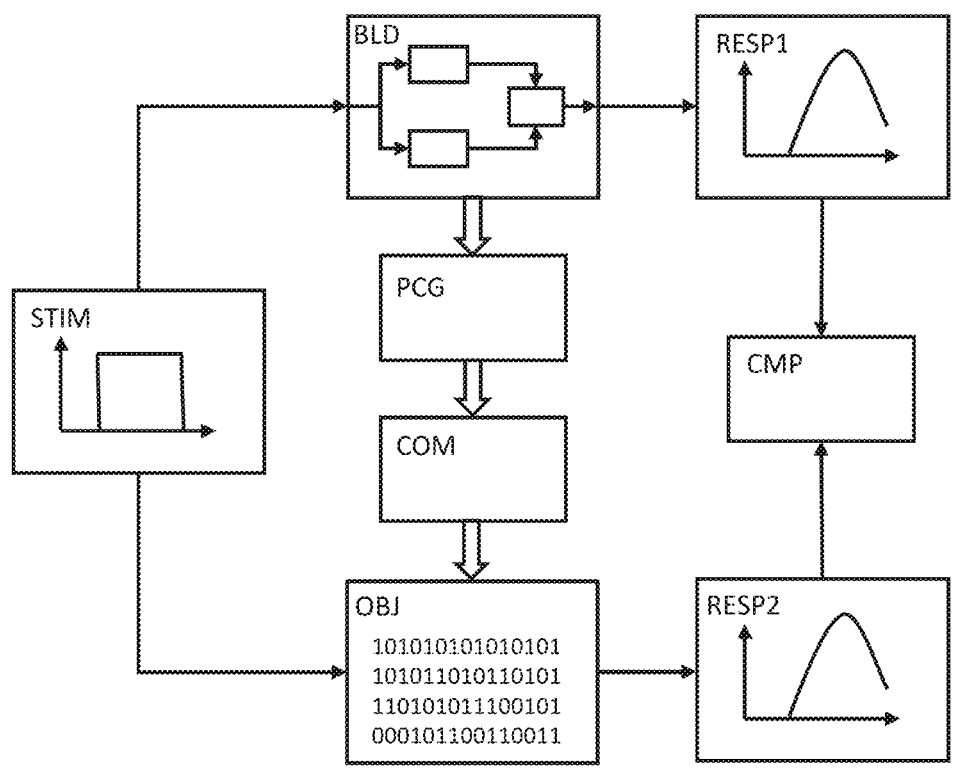
FIG. 4 is a schematic representation of the checking of the generated source code on the basis of the block diagram.

FIG. 4 schematically represents the checking of the generated source code on the basis of the block diagram.

The illustrated example schematically shows a block diagram BLD, respectively a subsystem composed of three blocks that has an input port for receiving an input signal and an output port for transmitting an output signal. The block diagram may expediently describe a predetermined or desired behavior of a control program. If the block diagram is executed in the simulation environment, the behavior is then computed for successive time steps; in particular, block diagram BLD may be directly interpreted here. From the specification, respectively the intended application, a few test cases were ascertained in advance, which, in particular included stimuli STIM as input signals for the control program, an output signal RESP indicative thereof being associated with the stimuli.

In the example shown, a stimulus STIM is shown as a diagram which indicates a specific temporal behavior of the input signal. When the control program, respectively block diagram BLD is executed in the simulation environment of the computer system, an instantaneous value of stimulus STIM is applied to the input port of block diagram BLD for a multiplicity of time steps, and the operations corresponding to the blocks are computed to ascertain an internal state and/or an output signal of the control program. By recording the output signal during execution of the block diagram, a target response RESP1 may be ascertained in a model-in-the-loop simulation. Since all arithmetic operations are computed at high precision, for example, by variables always having the double data type, and thus floating point computations being performed, on the one hand, the correct behavior of the model may be verified and, on the other hand, the simulation result is accurate enough for the stored output signal, respectively the target response RESP1 to be used as reference data.

Thus, once the correctness of the model is confirmed, code generator PCG generates source code from the blocks of the block diagram corresponding to the control program. The generated source code is subsequently compiled by a compiler COM into object code OBJ, which expediently contains instructions for the processor of the target system. The object code is preferably combined by a linker into an executable file in the operating system of the target system. During code generation, settings for converting the model operations into fixed point representation, thus, which also include a corresponding scaling, respectively, in general, transformations to reduce the computational outlay, may be applied to make possible a real-time execution on less powerful hardware as well, such as a microcontroller of an embedded system ES.

A software-in-the-loop simulation, where the target system corresponds to computer system PC, or a processor-in-the-loop simulation, where the target system is an embedded system, is expediently performed to ensure that the optimized version of the control program, respectively the generated source code has a behavior that corresponds to the block diagram. Here, during the predetermined execution period, the executable file having object code OBJ is fed to stimulus STIM, and the output signal of the generated source code resulting from the computations is recorded to obtain actual response RESP2.

Target response RESP1 of the model-in-the-loop simulation may be displayed on the computer system simultaneously with actual response RESP2 of the generated code to provide the user with a visual comparison. Alternatively or additionally, a comparison of target response RESP1 and actual response RESP2 may also be computed in a comparison program CMP. This makes it possible, for example, to determine a deviation measure and/or check one or a plurality of test conditions, for example, the computation of a point-by-point difference between the actual response and the target response and the comparison with a threshold value, respectively a maximally permissible deviation.

The following is intended to provide an overall view of service-based communication. In general, in service-based architectures, services are provided by service providers. A service may thereby include functions (and possibly other components) that may be used by a consumer. The service includes a formal machine-readable description of the properties of the service.

In a communication system, a service may be simultaneously offered by a plurality of service providers. The result of a service provider offering a service is a "service instance" that must be uniquely identifiable. For example, a technical identifier of a service instance in a TCP/IP based system may be a combination of an IP address and a port of the instance of an application that provides a service.

These service providers may be registered in a service registry to provide notification of the service offering thereof. Once the service provider has provided notification of the service offering, a consumer may check the service registry to query about the available service instances for a specific service. If there are a plurality of service instances of a service, the consumer must select the provider (i.e. the instance of the service) that he/she would like to communicate with. This process is referred to as "service discovery."

EXAMPLE

Conceivable in the context of model-based software development in the automotive environment is a "TemperatureSensor" service, which permits access to a temperature sensor. In the simplest case, this service features only one single functionality, namely querying a temperature value. A hypothetical rendering of a formal description could appear as follows:

```
Service TemperatureSensor
{
    Function int gettemperature( );
}
```

It is conceivable that different instances of this service exist in a vehicle: for example, an instance in the engine compartment, an instance in the passenger compartment, and an instance which measures the outside temperature. At this stage, applications are able to communicate with certain instances of these services. In the development of a control of the engine, for example, a user could then want to use the instance of the temperature sensor in the engine compartment.

Figure 5:
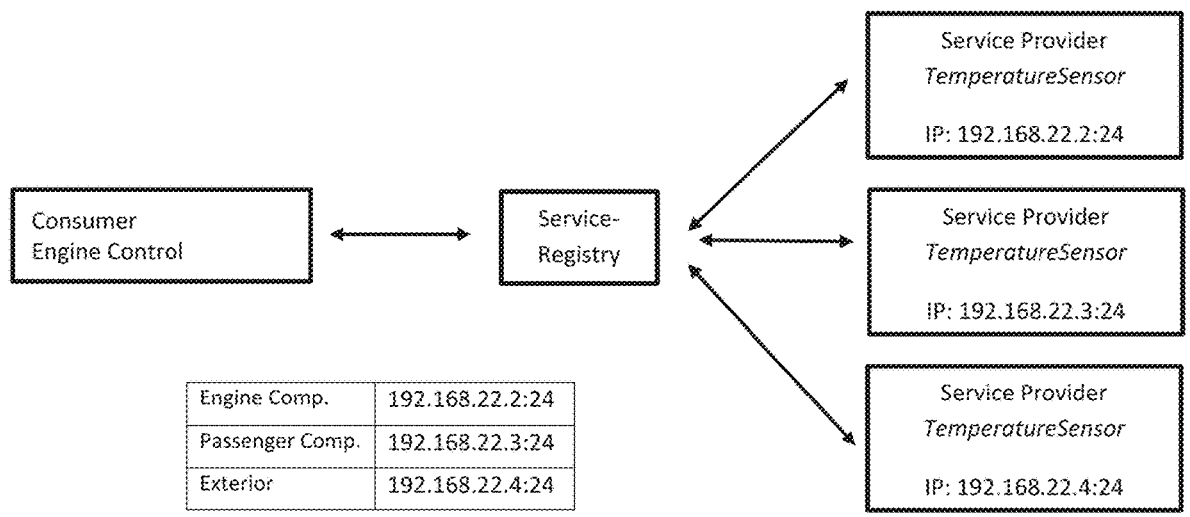
FIG. 5 is a schematic representation of an architecture that includes one consumer and three service providers.

The result is the architecture shown in FIG. 5. The information where the individual instances are located, may be realized via an external information source, for example, a mapping IP<-> location (engine compartment, passenger compartment, exterior); this is shown exemplarily as a table in the figure.

Figure 6A:
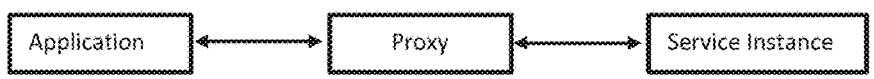
FIG. 6*a* is a schematic connection between an application and a service instance via a proxy.

The present invention may be used, in particular, for the service-based communication for which the adaptive AUTOSAR platform having the functional cluster ara::com provides an API (application programming interface). With the aid of this API, applications, which offer or consume services, may be developed for use in the vehicle. Similarly, the adaptive AUTOSAR standard defines possibilities for formally defining services via what are generally referred to as service interfaces. If an AUTOSAR application would like to use a service, the application communicates with the service provider by way of the AUTOSAR middleware via what is generally referred to as a "proxy" object. A proxy object may have a C++ class design, for example, including methods for finding a service, and for reading and/or setting a value. From the perspective of the application, the image shown in FIG. 6a results: The application is connected to a proxy which, in turn, is connected to a service instance.

Figure 6B:
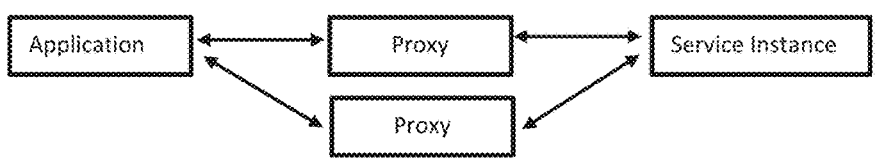
FIG. 6*b* is a schematic connection between an application and a service instance via two alternative proxies.

Since a proxy object contains state information (for example, a queue of events sent by the service instance to the application), there are also applications cases for using a plurality of proxies per service instance; this is shown in FIG. 6b for the case of two proxies. For a service, a multiplicity of proxies may be generated, which, for example, have buffers of different sizes for buffer storing values.

To identify a service instance, AUTOSAR offers two options: a technical and a logical identifier. The technical identifier ("InstanceIdentifier") identifies a service instance on the basis of a transfer-specific feature, for example, a combination of an IP address and a port number in the case of TCP-IP communication, as in the previous example. The logical identifier ("InstanceSpecifier") identifies a service instance on the basis of an abstract name, which subsequently (at the time of deployment) may be mapped to a technical identifier. In the above example, for example, "Temp SensorEngineCompartment," "Temp SensorInterior," "TempSensorExterior" could constitute meaningful logical identifiers.

To be able to generate production code for an adaptive AUTOSAR application on the basis of models, a support of the functional cluster ara::com is provided in the technical computing environment, enabling the users to describe many aspects of service-based communication in the model. This support for service-based communication is expediently composed of two sub-areas: the area of service discovery and the use of the services for actual communication. The present case primarily deals with the area of service discovery.

The difficulty of the objective resides in the dynamics thereof: In contrast to a completely statically configured classic AUTOSAR system, the service discovery process, in particular may only be transferred with difficulty to a classic Simulink model, since, here, no behavior of a classic controller is to be modeled, rather network-oriented code is to be generated, which is not able to be expressed or modeled by stylistic devices existing until now.

Whenever possible, the present invention allows the customer to model the characteristics of the service discovery in the model and generate production code for this purpose. To illustrate various aspects of the present invention, the key question of assigning a specific instance of a communication service to a particular model element is to be divided here into two subquestions:
1. How does the user describe the manner in which a determination is made as to which instance of a service is used for a particular model element (particularly when a plurality of service instances exist for a service in the model)?
2. How does the user describe which proxy instance is to be used for a particular model?

Aspect 1: Description of the Selection Process

It is advantageous that a user be given the choice of various predefined selection methods. Each of these selection methods leads to a unique service instance, even if a plurality of instances of a service are available in a communication network. In particular, the following selection methods may be provided:

SelectionCriteria None:
No service discovery code is generated; the user himself/herself is able to implement how he/she arrives at a proxy for a service. The application source code then uses the proxy set by the user at the modeled points in the production code.

SelectionCriteria FirstInContainer:
In response to a service discovery request, a container may be returned which, for example, contains a list of a plurality of service instances. Once a service discovery is implemented, the first instance found in the result container continues to be used. Here, "first" instance refers to the order in the container, not to a temporal relation.

SelectionCriteria InstanceIdentifier:
A connection to a service instance, which is described by the technical identifier "InstanceIdentifier," is established.

SelectionCriteria InstanceSpecifier:
A connection to a service instance, which is described by logical identifier "InstanceSpecifier," is established.

SelectionCriteria Custom:
Similar to None. However, the customer may specify an (external) function that undertakes the selection of a service instance from a plurality of found service instances from a service.

Aspect 2: Mapping the Selected Service Instance/Proxy Object to Model Elements

To establish the connection between a model element and the result of the service discovery method, a discovery object is used in the data definition collection DDT; this discovery object may then be referenced at the corresponding points in the model.

Figure 7:
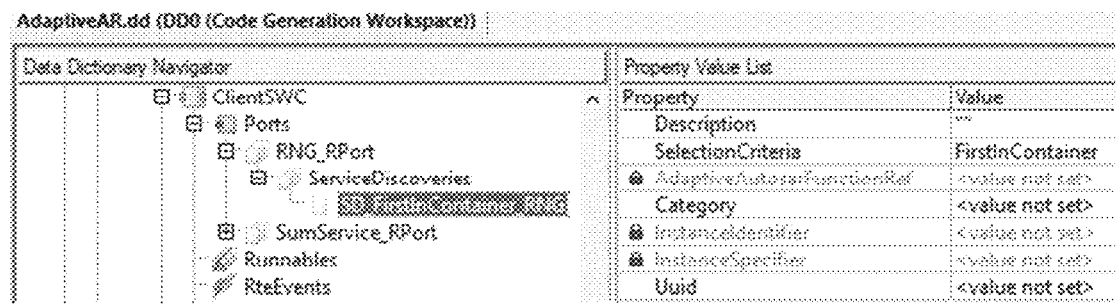
FIG. 7 is a schematic representation of an object in a data definition collection.

A discovery object has properties that describe how the instance of a service to be used may be determined. In a specific implementation of Adaptive AUTOSAR, for example, the property "SelectionCriteria" of a discovery object in the DDT is used for this purpose. It makes it possible to set the available selection conditions or selection methods mentioned in Aspect 1 and provides further configuration options for refining the methods. FIG. 7 is a view of a user interface, the TargetLink DataDictionary Manager in which the properties of a discovery object are shown in the DDT.

Figure 8:
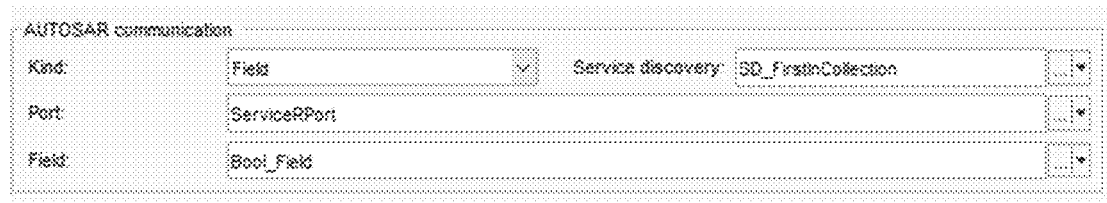
FIG. 8 is an exemplary dialog for referencing an object in a block dialog.

The thus described discovery object may then be used at the points in the block diagram (TargetLink/Simulink model) where an AUTOSAR communication is to be specified, such as, input/output blocks, inputs/outputs or special method call subsystems, for example. From this discovery object, the code generator may then generate source code which implements the service discovery in the later production code. In this case, the same code generator may be used as for the block diagram or a dedicated code generator for service discovery source code. FIG. 8 shows an example of a user interface where the reference of a discovery object may be set in the block diagram, respectively how the service discovery object is referenced in the block dialog.

Aspect 3: Consideration of Proxy Objects Using States

Referencing a discovery object does not specify the assignment of a service instance to a model element, rather the assignment of a proxy object to a model element. This detail provides a further benefit to the user: If a proxy object includes internal states, the user is able to precisely describe which model elements share which proxy objects (and thus which states of the proxy object). He/she may also set two model elements to reference the same discovery object, and thus only one proxy is generated. Under Example 2, the following also shows that a plurality of proxies may be connected to the same service instance.

The thus defined objects/model situations may then be translated by a code generator into service discovery code, respectively source code, which includes code components for implementing the service discovery. Depending on the selected method (for example, SelectionCriteria None), it may be necessary for the user to add additional components manually.

In addition to the production code generator described in conjunction with FIG. 4 that generates optimized application source code from block diagrams, a second, specialized code generator may be used to implement the service-based communication. It reads in only information on the model elements used for the service-based communication and, on the basis thereof, generates a separate service discovery source code. Alternatively, it may also be provided for the production code generator to be adapted in such a way that code generation options or also the generated language scope be selected differently for the service discovery code than for the production code generated from the blocks of the model.

Aspect 4: Lucidity/visualizability of the Service Instances/Proxy Objects Used

An exemplary embodiment of the present invention also provides that a user interface be made available which, in a block diagram, respectively model, visually represents the service instance to be used. This makes it possible for a user to readily check if model elements unintentionally share a service instance in the modeled application. This is substantially simpler to check in a graphical representation than in the textual source code. This may be an important aspect for the user, since, to a greater degree, it enables him/her to thereby ensure the correctness of the functional specification.

The following will provide a few examples of applications of the present invention.

Example 1: Communication With a Specific Instance

Figure 9:
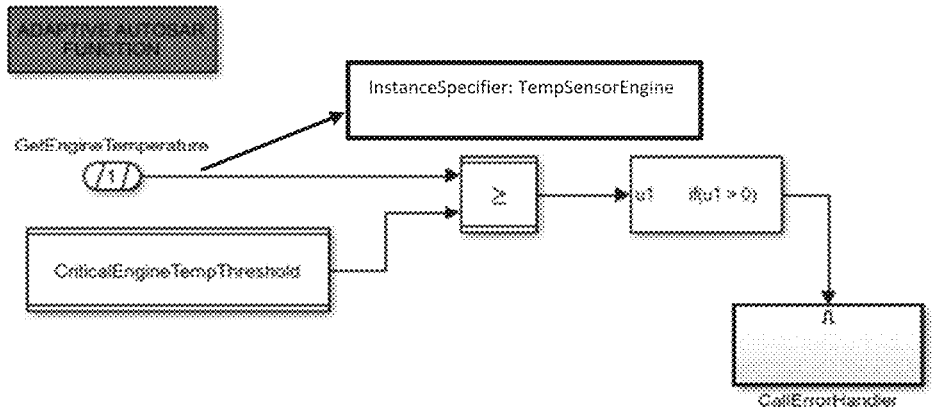
FIG. 9 is a schematic representation of a model that includes use of an InstanceSpecifier.

FIG. 9 shows a software component, an adaptive AUTOSAR subsystem that models a functionality that is to access the engine temperature of a vehicle, it being intended that a logical instance "TempSensorEngine" of the service "TemperatureSensor" be used. This is expressed in the model by a discovery object being referenced at the port where the selection criterion "InstanceSpecifier" is set, and the service instance "TempSensorEngine" has been selected. Thus, the use of a logical identifier (InstanceSpecifier) is specifically shown in this example. A code generator could then evaluate the information of the discovery object and, for example, create the following code for the service discovery:

With respect to the application example "Temperature-Sensor," it would be conceivable, for example, for a sensor to periodically and actively send temperature information to receivers per adaptive AUTOSAR event. The receiver could hold different proxies at different queue lengths for various purposes. For example, a submodel, respectively a subfunctionality of the application could be interested in a history of temperature data (particularly to determine an average) and, for this reason, select a queue length of 10. Another subfunctionality could only be interested in the last temperature value received, i.e. for this reason, use a queue having a length of 1.

Figure 10:
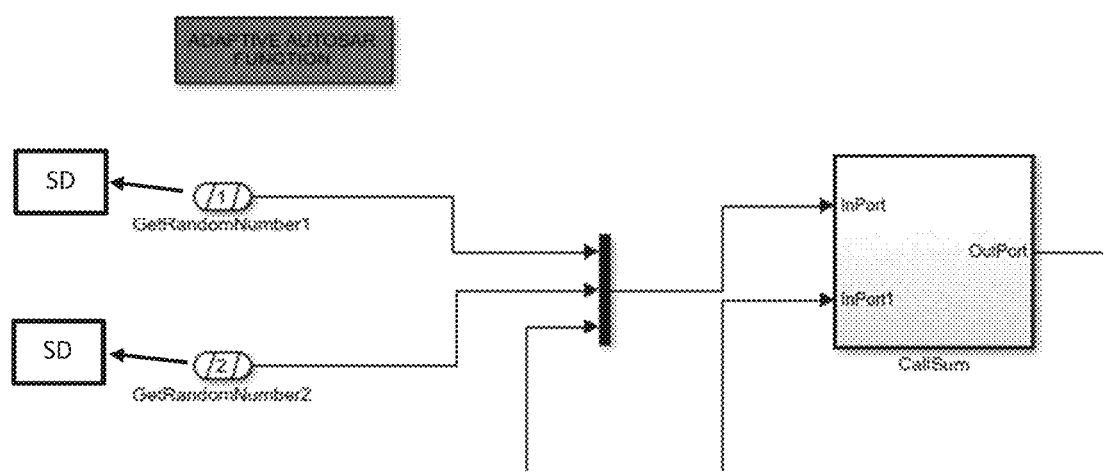
FIG. 10 is a schematic representation of a model that uses two proxies.

To realize this scenario using the present invention, the user would preferably create two discovery objects having substantially identical settings. All properties related to determining the desired service instance are identically specified. Deviations only occur where state-specific properties of the proxy object are described (for example, the queue length). This is schematically illustrated in FIG. 10, which shows a submodel that is connected by signal lines to other submodels. From the two discovery objects SD, in

```
bool PerformServiceDiscovery_ClientSWC_Subsystem( )
{
    bool DiscoveredAllServices = true;
    {
        auto HandleContainer = proxy::TemperatureSensorProxy::FindService(
ara::com::InstanceIdentifier(std::string("TempSensorEngine")));
        if (!HandleContainer.empty( ))
        {
            auto ServiceHandle = *HandleContainer.begin( );
ProxyContainer_ClientSWC_Subsystem_Instance.pTemperatureSensorEngineInstanceProxy
= std::make_unique<proxy::TemperatureSensorProxy>(ServiceHandle);
        }
        else
        {
            DiscoveredAllServices = false;
        }
    }
    return DiscoveredAllServices;
}
```

Example 2: Communication With Any Instance

In a vehicle network, a redundant design of certain functions may be necessary. In these scenarios, it is expedient to implement a redundantly designed function as a service that is provided by a plurality of mutually independent, functionally equivalent service instances. If, in the modeled application (from the perspective of the application), it is intended to communicate with any available service instance of this redundant function, then a discovery object having the selection criterion "FirstInContainer" may be used in the corresponding block. The proxy generated thereupon will connect to the first service instance signaled back in response to the service discovery request.

Example 3: Use of Various Proxies of the Same Service Instance

If, on the other hand, the user would like to use the same service instance, but a different proxy instance, then he/she may copy the discovery object and, in each case, use one of the two copies at the inports of the corresponding submodel, respectively subsystem. This variant is of interest for the case that proxies themselves form states—this may be the case for proxies which contain queues for querying events. In accordance with the adaptive AUTOSAR standard, events are sent by a service provider to the consumers and held internally in a queue in the proxy. Different proxies could use queues of different lengths, for example.

particular, service discovery source code is then generated in each case, which queries a list using numbers of service instances, and, in each instance, uses the same service instance, but, through adapted parameters, selects the different buffer sizes, respectively queue lengths upon invoking the proxy constructor.

The present invention has been described for the "adaptive AUTOSAR" application, but is applicable to other service-based communication architectures, respectively general communication frameworks for service-based communication.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for generating source code from one or more blocks of a block diagram, the method comprising:
   opening, by a computer system, the block diagram in a model editor, wherein the block diagram includes a first block that exchanges data with an external service, wherein the first block references a discovery object in a data definition collection, wherein the discovery object defines a selection criterion;
   reading out, by the computer system, the referenced discovery object from the data definition collection;
   generating, by the computer system, application source code based on at least the first block; and
   generating, by the computer system, service discovery source code based on at least the referenced discovery object, wherein the service discovery source code is configured for selecting a provider for a service instance of the external service out of one or more service instances of the external service.

2. The method according to claim 1, wherein:
   the selection criterion is predetermined by user-provided code;
   a first service instance signaled back in response to a service discovery request is selected;
   a service instance signaled back in response to a service discovery request is selected based on a predetermined technical identifier; or
   a service instance signaled back in response to a service discovery request is selected based on a predetermined logical identifier.

3. The method according to claim 1, wherein the application source code is optimized with regard to code size and/or execution time, and the service discovery source code is generated without optimization.

4. The method according to claim 1, wherein the application source code is generated by a first code generator, and the service discovery source code is generated by a second code generator, the first code generator being adapted for processing a multiplicity of blocks of the block diagram to generate an intermediate representation and to generate source code therefrom in a textual programming language, and the second code generator not being adapted for processing blocks of a block diagram.

5. The method according to claim 4, wherein the first code generator is adapted for applying a multiplicity of optimization rules and/or transformations to the generated intermediate representation to generate the application source code.

6. The method according to claim 1, wherein, during or after generation of the application source code, information is stored at least via the first block in the data definition collection; and
   wherein the service discovery source code is generated solely based on information from the data definition collection.

7. The method according to claim 1, wherein the generated source code is used on a control unit in an adaptive AUTOSAR environment.

8. The method according to claim 1, wherein the block diagram includes a second block which references a discovery object, wherein the discovery object referenced in the first block and the discovery object referenced in the second block have the same selection criterion but differ at least with respect to a queue length; and
   wherein service discovery source code for addressing two separate service proxies is generated from the two discovery objects.

9. A non-transitory computer-readable memory medium having processor-executable instructions stored thereon for generating source code from one or more blocks of a block diagram, wherein the processor-executable instructions, when executed by a processor, facilitate:
   opening the block diagram in a model editor, wherein the block diagram includes a first block that exchanges data with an external service, wherein the first block references a discovery object in a data definition collection, wherein the discovery object defines a selection criterion;
   reading out the referenced discovery object from the data definition collection;
   generating application source code based on at least the first block; and
   generating service discovery source code based on at least the referenced discovery object, wherein the service discovery source code is configured for selecting a provider for a service instance of the external service out of one or more service instances of the external service.

10. A computer system for generating source code from one or more blocks of a block diagram, comprising:
   a human-machine interface;
   a non-transitory memory having processor-executable instructions stored thereon; and
   a processor, wherein the processor is configured to execute the processor-executable instructions to facilitate performance of the following by the computer system:
   opening the block diagram in a model editor, wherein the block diagram includes a first block that exchanges data with an external service, wherein the first block references a discovery object in a data definition collection, wherein the discovery object defines a selection criterion;
   reading out the referenced discovery object from the data definition collection;
   generating application source code based on at least the first block; and
   generating service discovery source code based on at least the referenced discovery object, wherein the service discovery source code is configured for selecting a provider for a service instance of the external service out of one or more service instances of the external service.

* * * * *